Nov. 2, 1943.    W. L. JONES    2,333,183
SPRING END MOUNTING MEANS
Filed Dec. 4, 1941    2 Sheets-Sheet 1
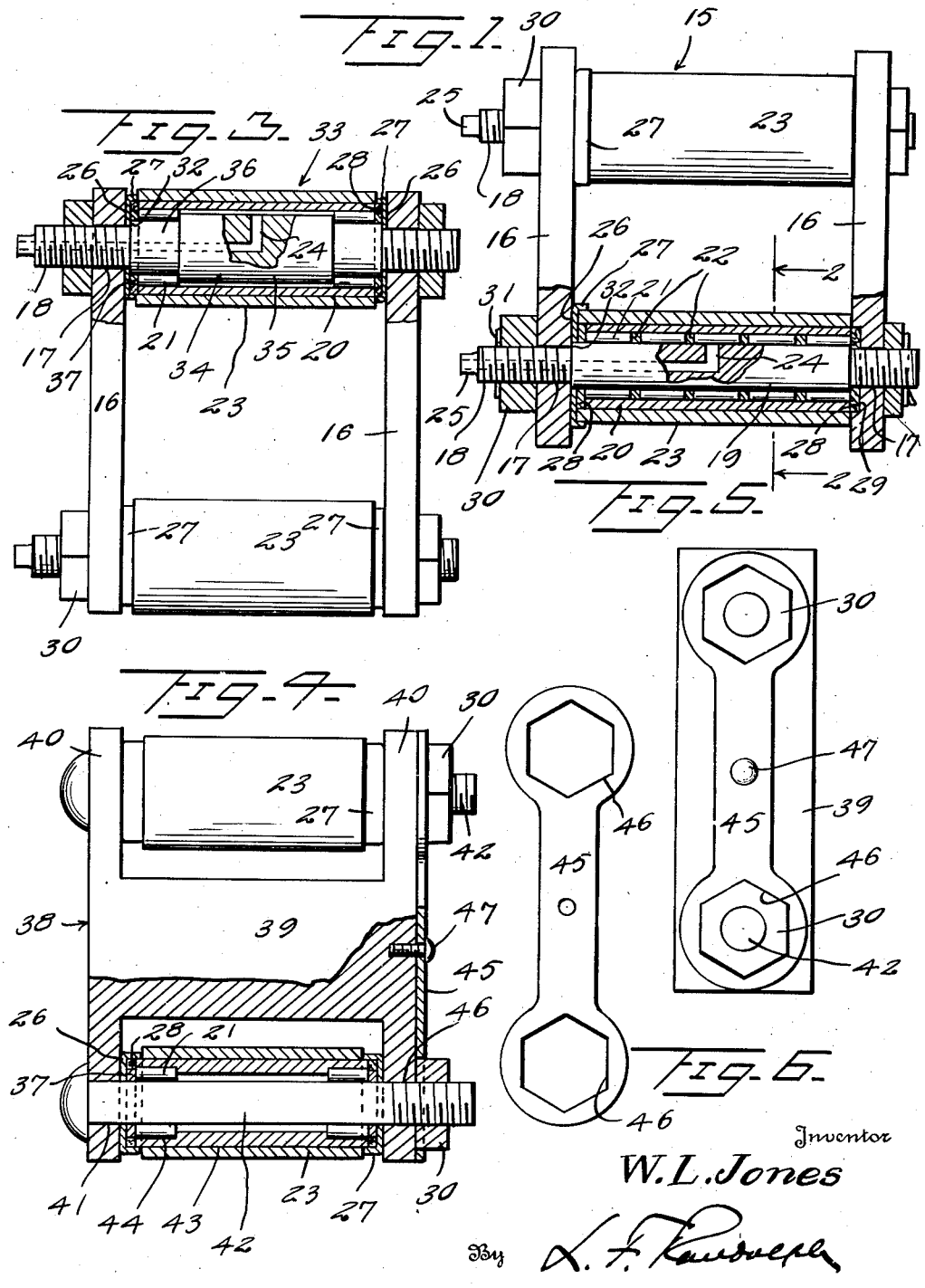
Inventor
W. L. Jones

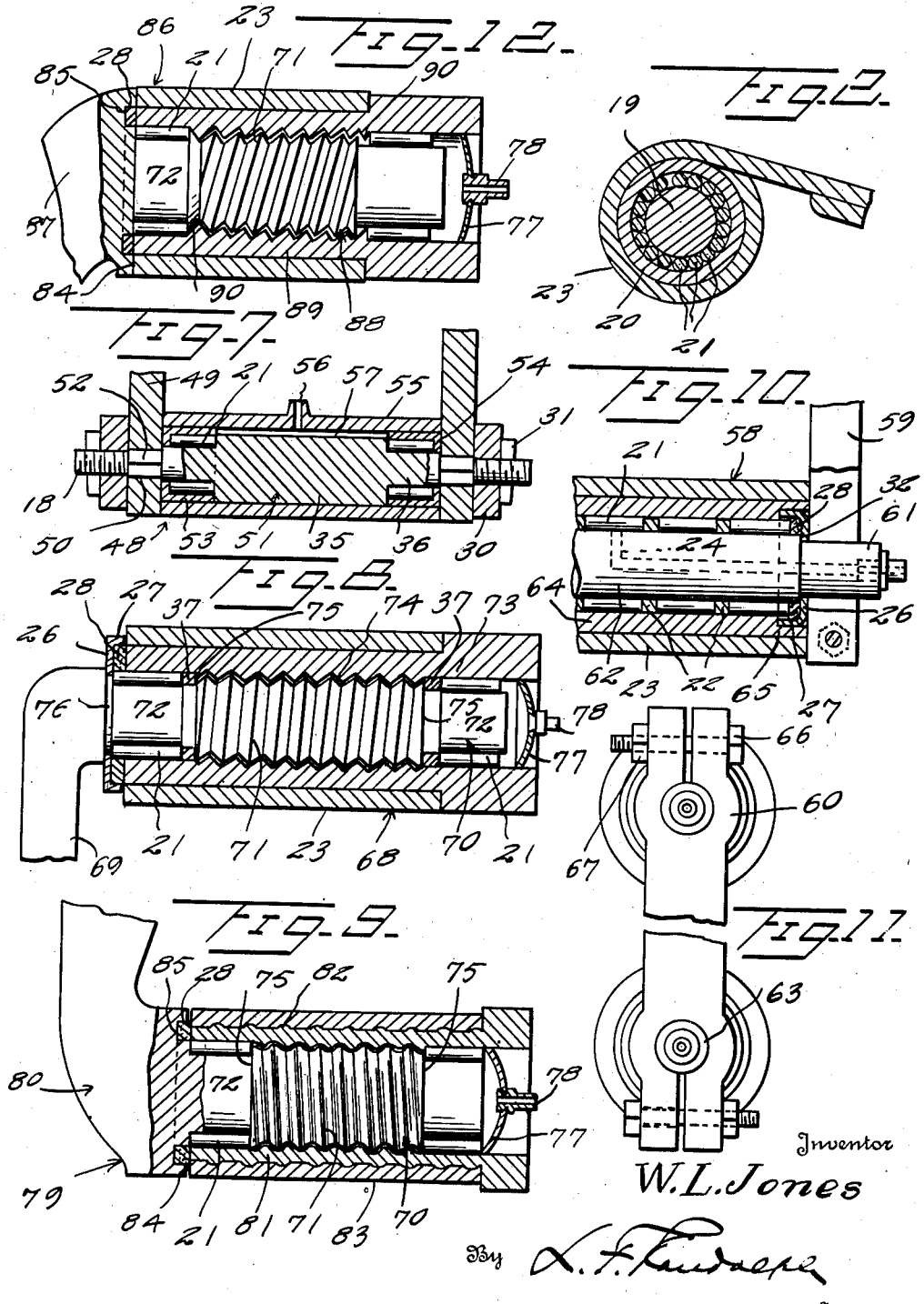

Patented Nov. 2, 1943

2,333,183

UNITED STATES PATENT OFFICE 2,333,183

SPRING END MOUNTING MEANS

William L. Jones, Centralia, Ill., assignor of fifty-one per cent to Glenn W. Johnson, Centralia, Ill.

Application December 4, 1941, Serial No. 421,673

1 Claim. (Cl. 267—54)

This invention relates to improvements in spring end mounting means for motor vehicles adapted to be used on large and small passenger cars and heavier vehicles, such as trucks.

More particularly, it is an aim of the invention to provide spring end mountings including bushings turnably supported on pins or bolts by a plurality of sets of needle bearings.

Another object of the invention is to provide improved dust guard means for protecting the bearings from dirt or grit.

A further aim of the invention is to provide means for lubricating the spring mountings.

Other objects and advantages of the invention will hereinafter become more fully apparent from the following description of the drawings, which illustrate preferred embodiments thereof, and wherein:

Figure 1 is a side elevational view, partly in section of one form of spring mounting particularly intended for use on heavy trucks, Figure 2 is a cross sectional view through a portion of the same taken substantially along a plane as indicated by the line 2—2 of Figure 1, Figure 3 is a view similar to Figure 1 of another form of spring mounting, Figure 4 is a view similar to Figure 1 of a modification of Figure 3, Figure 5 is an end view in elevation looking toward the right hand end or edge of Figure 4, Figure 6 is a plan view of the nut retaining member, shown in Figures 4 and 5, Figure 7 is a fragmentary substantially central sectional view of another form of spring mounting for use on small passenger automobiles, Figure 8 is a substantially central sectional view, partly in elevation of another form of spring mounting for use with a U-type of shackle, Figure 9 is a view similar to Figure 8 of a modification thereof, Figure 10 is a fragmentary substantially central sectional view, partly in elevation of a modified form of the spring mounting shown in Figure 1, Figure 11 is an edge view in elevation of a spring mounting of the type shown in Figure 10, and Figure 12 is a view similar to Figure 8 of a slightly modified form thereof.

Referring more particularly to the drawings, wherein like reference characters designate like or corresponding parts throughout the different views, and referring particularly to Figures 1 and 2 which illustrate a spring mounting, designated generally 15, especially intended for use on heavy trucks and the like and including a shackle formed of bars 16 having openings 17 adjacent the ends thereof. The complementary openings 17 are adapted to receive threaded, restricted ends 18 of a pin or bolt 19. On each of the pins 19 is mounted a sleeve type bushing 20. Between the pin and bushing is a plurality of sets of needle bearings 21 to provide anti-friction means for supporting the bushing on the pin. The sets of needle bearings 21 are spaced from each other by means of spacing rings or ribs which can be loosely mounted on the pin or formed integral therewith, as seen at 22. A spring eye 23 is mounted on the bushing 20.

The pin 19 is provided with a lubricating passage 24, one end of which opens outwardly of an end 18 and which is provided with a fitting 25, and the opposite end of which opens into the space between the pin and bushing for lubricating the bearings 21. The shackle 15 may be provided with a ring type dust guard 26, as shown in the lower left hand corner of Figure 1, which is loosely mounted on the pin 19 and against the inner side of one of the bars 16 and which is provided with a flange 27 for engaging over an end of the spring eye 23. A packing ring 28 of yieldable material, such as felt or cork, is disposed between the dust guard 26 and an end of the bushing 20 and an end of one of the outer sets of bearings 21. In lieu of the dust guard, previously described, the inner side of the bar 16 can be recessed, as seen at 29, to receive the yieldable packing ring 28, as shown in the lower right hand corner of Figure 1. Nuts 30 engage the threaded ends 18 and bear against the outer sides of the bars 16 for holding the shackle 15 assembled, and a key or cotter pin 31 can be provided for holding each of the nuts 30 in place. The restricted ends 18 form outwardly facing shoulders 32 on the pin 19 which bear against the inner sides of the bars 16 for holding the bars spaced sufficiently so as not to bind against the bushing 20 and spring eye 23.

From the foregoing, it will be obvious that the spring eye will turn freely with the bushing on the rollers 21 and relatively to the pin 19 to provide a free acting spring mounting which can be readily lubricated and which can be sealed to prevent dust and dirt from reaching the interior thereof.

Referring to Figure 3, a spring mounting, designated generally 33, is herein illustrated, having a shackle formed of bars 16 provided with openings 17 for receiving the threaded ends 18 of a pin 34, which differs from the pin 19 in that it is provided with an enlarged intermediate portion 35 and slightly restricted portions 36 between the portion 35 and the ends 18 on each of which is mounted a set of needle bearings 21 for turnably supporting a bushing 20 on the pin 34 and on which, in turn, is mounted a spring eye 23. The ends of the portion 35 form shoulders against which the inner ends of the bearings 21 engage. The ring shaped dust guard 26 loosely engages each of the threaded ends 18 and bears against a shoulder 32 formed by the outer end of a portion 36. The flange 27 of each dust guard 26 bears against an end of the spring eye 23 and the dust guards 26 are disposed against the inner sides of the bars 16. A spacing ring 37 is disposed on each of the portions 36 for spacing a set of the bearings 21 from the dust guard 26, adjacent thereto. A packing ring 28 is disposed around each ring 37 and within a flange 27. The pin 34 is provided with a lubricating passage 24 corresponding to that of the pin 19 and nuts 30 engage the ends 18 for holding the bars 16 applied.

A spring mounting, designated generally 38, as shown in Figure 4, includes an H-shaped shackle 39, the legs 40 of which are provided with correspondingly disposed openings 41 for receiving conventional bolts 42 which replace the bolts or pins 19 or 34 each of which is provided with a headed and a threaded end for receiving a nut 30 for retaining the bolt 42 in position. A bushing 43 is mounted on each of the bolts 42 and is provided with recessed ends 44 for receiving sets of needle bearings 21 at the outer ends of which are arranged dust guards 26, rings 28 and rings 37, in the same manner as shown in Figure 3. The spring eye 23 is mounted on each of the bushings 43. The ends of the bushings 43 extend beyond the ends of spring eyes 23 to receive the flanges 27 which engage thereover. A bar or plate 45 is provided with enlarged ends having openings shaped and sized to fit the nuts 30, as best seen in Figure 6 at 46. The plate 45 is fastened by means of a screw 47 to the shackle 39 and functions to prevent the nuts 30 from being removed while the plate 45 is applied, as seen in Figures 4 and 5. It will likewise be readily obvious that the plate or bar 45 can be used as a wrench for applying or removing the nuts 30 and can be employed on the nuts 30 of the spring mountings 15 and 33, if desired.

In Figure 7, a part of the spring end mounting, designated generally 48, is illustrated, which is especially adapted for use on Ford automobiles and which includes a shackle formed of bars 49 having openings 50, adjacent their ends, which are substantially square or polygonal shaped cross section. Mounting 48 includes a pin 51 similar to the pin 34 and having the portions 35 and 36 and the threaded ends 18, corresponding to the pin 34, but which is also provided with portions 52, between the threaded ends 18 and the portions 36 and which are shaped and sized to fit the openings 50. The portions 36 mount sets of needle bearings 21, the inner ends of which bear against the ends of the enlarged intermediate portion 35. Cup shaped bushing members 53 have openings for loosely engaging the portions 36 and annular bottom portions 54 which are disposed between the outer ends of the bearings 21 and the inner sides of the bars 49. The bushings 53 surround the sets of bearings 21 and support the spring eye 55 thereon. The eye 55 is provided with a lubricating port 56 which communicates with a groove or flat portion 57 in the pin part 35 for conveying a lubricant to the bearings 21. The pins 51 are provided with nuts 30 and retaining pins 31 for holding the shackle 48 assembled.

In Figures 10 and 11, a spring end mounting 58 is shown which constitutes a slight modification of the spring end mounting 15 and which is provided with a shackle composed of a pair of bars 59, only one of which is shown, having bifurcated ends 60. The bifurcated ends 60 are adapted to receive restricted unthreaded ends 61 of a pin 62 in openings 63 thereof. Except for the fact that the ends 61 are not threaded, the pin 62 corresponds to the pin 19. Each of the pins 62 carry sets of needle bearings 21, spacing rings or ribs 22, a bushing 64 and a spring eye 23. The bushings 64 differ from the bushings 20 in that they are provided with recessed ends 65 for receiving the flanges 27 of dust guards 26 which are turnably mounted on the ends 61, between the bars 59 and the shoulders 32 of the pins 62. Pins 62 are also provided with lubricating passages 24. The bifurcated ends 60 have bolts 66 extending therethrough, adjacent their outer ends, and provided with nuts 67 which can be tightened for clamping the pin ends 61 to the bars 59. The dust guards 26 are also provided with packing rings 28.

In Figure 8, a spring end mounting, designated generally 68, of a different type is shown, and which includes a shackle 69 of the U-type such as shown in my prior Patent No. 2,251,843, issued August 5, 1941. Only one end of the shackle 69 is illustrated, and said end is provided with a pin 70 having an intermediate, enlarged threaded portion 71 and restricted end portions 72. A bushing 73 of the sleeve type is provided with a bore having an intermediate threaded portion 74 for loosely engaging the thread 71. The outer end of the thread 71 terminates in an annular shoulder 75 forming a seat for a spacing ring 37, mounted on the outer portion 72. The inner end of the thread 74 terminates in a similar shoulder 75 for engaging another ring 37, mounted on the other portion 72. Portions 72 are provided with sets of needle bearings 21 which support the bushing 73 and which are held out of engagement with the threads 71 and 74 by the rings 37. A spring eye 23 is disposed around the bushing 73 which is provided with an enlarged outer end for holding the spring eye in place thereon. The shackle 69, at the inner end of the pin, is provided with a restricted portion 76, larger in diameter than the thread 71, for seating a dust guard 26, having a packing ring 28 which bears against the inner end of the bushing 73 and a flange 27 which is disposed around the packing ring. The outer open end of the bore of the bushing 73 is adapted to be closed by a cap or plug 77 which is pressed therein or otherwise attached thereto, and which is provided with a "Zerk" or other type lubricating fitting 78.

From the foregoing, it will be obvious that rollers or needle bearings 21 will support the bushing 73 so that it can turn freely on the pin 70 to the limited extent required for operation of the spring of which the eye 23 forms a part.

Figure 9 shows a spring end mounting 79 forming a slight modification of the mounting 68 and having a pin 70 at one end of a shackle 80, the thread 71 of which is inclined in the opposite direction to the thread 71 of the shackle 69. The pin 70 of the shackle 80 has end portions 72 provided with sets of needle bearings 21 for supporting a bushing 81 which differs from bushing 73 in that it is also externally threaded, as seen at 82, and is not provided with a shoulder 75. Both ends of the threaded portion 71 are provided with shoulders 75 against which the inner ends of the needle bearings 21 engage. A spring eye 83 is internally threaded to engage the threads 82 to extend in the same direction as the threads 71 so that the bushing 81 can be screwed onto the pin 70 and into the eye 83 at the same time. The portion of the shackle 80 around the inner end of the pin 70 forms a shoulder 84 against which the inner ends of the bushing and eye engage and which is provided with an annular groove 85 for receiving a packing ring 28. The cap 77 having a fitting 78 is pressed into the outer end of the bushing 81.

In Figure 12 another modification of the spring mounting of Figure 8 is shown, designated generally 86, and comprising a U-type shackle 87 having a pin 88 provided with a threaded portion 71 and end portions 72 in which are mounted sets of needle bearings 21 for supporting a bushing 89, similar to the bushing 73 but not provided with a shoulder 75. Beyond the inner end of the thread 71, the pin 88 is provided with an annular shoulder 90 forming an abutment for the inner set of bearings 21. The shoulder 90 has a bevelled side facing toward the thread 71 against which the inner end of the thread of the bushing 89 engages when the spring mounting is moved to the limit of its inward movement.

The outer end of the thread of the bushing 89 is provided with a similar shoulder 90 to be engaged by the outer set of bearings 21 and having a bevelled inner side for engaging the outer end of the thread 71. The shackle 87 is provided with a shoulder 84, groove 85 and packing ring 28. The outer end of the bushing 89 is provided with a cap or plug 77 and fitting 78. The spring eye 23 of the shackle 87 corresponds to spring eye 23 in Figure 8.

Various modifications and changes in the embodiment of the invention, as disclosed, are contemplated and may obviously be resorted to, provided they fall within the spirit and scope of the invention as hereinafter defined by the appended claim, as only preferred embodiments thereof have been disclosed.

I claim as my invention:

A spring end mounting means including a shackle having spaced bars provided with aligned openings, a pin mounted in said openings, bushing means turnably mounted on the pin and longitudinally immovable relatively thereto, said pin having shoulders for engaging and spacing said bars, means for mounting a spring eye on the bushing against longitudinal movement, and a plurality of roller bearings disposed between the pin and bushing for providing an antifriction bearing support for the bushing and the pin.

WILLIAM L. JONES.